(12) United States Patent
Taneda

(10) Patent No.: US 8,615,840 B1
(45) Date of Patent: Dec. 31, 2013

(54) SURFACE CLEANING SYSTEM

(76) Inventor: Eric Taneda, Bellevue, WA (US)

( * ) Notice: Subject to any disclaimer, the term of this patent is extended or adjusted under 35 U.S.C. 154(b) by 1726 days.

(21) Appl. No.: 11/680,222

(22) Filed: Feb. 28, 2007

(51) Int. Cl.
*A47L 1/08* (2006.01)

(52) U.S. Cl.
USPC .................. 15/250.04; 15/250.24; 15/250.29

(58) Field of Classification Search
USPC ........... 15/250.04, 250.06, 250.003, 250.002, 15/250.02, 250.24, 250.13, 250.29, 15/205.26, 250.35, 250.36, 250.38, 15/250.39, 250.41, 250.19
See application file for complete search history.

(56) References Cited

U.S. PATENT DOCUMENTS

| | | | |
|---|---|---|---|
| 2,607,065 A | | 8/1952 | Dahlgren |
| 2,607,944 A | | 8/1952 | Turner |
| 2,738,536 A | | 3/1956 | Spencer |
| 2,829,394 A | | 4/1958 | Brigmon |
| 2,974,340 A | * | 3/1961 | Kopczynski ............. 15/250.001 |
| 3,025,555 A | * | 3/1962 | Ramirez .................... 15/250.24 |
| 3,688,334 A | | 9/1972 | Peterson |
| 4,274,175 A | * | 6/1981 | Nishikawa ................. 15/250.24 |
| 4,649,590 A | | 3/1987 | Merkel et al. |
| 4,782,548 A | | 11/1988 | Wong |
| 4,945,601 A | * | 8/1990 | Bilodeau .................... 15/250.24 |
| 5,428,859 A | | 7/1995 | Battlogg |
| 5,537,705 A | | 7/1996 | Battlogg |
| 5,613,267 A | | 3/1997 | Battlogg |
| 5,920,948 A | | 7/1999 | Hayashi et al. |
| 6,530,110 B1 | * | 3/2003 | Breau et al. .............. 15/250.003 |
| 6,546,590 B2 | * | 4/2003 | Waters ..................... 15/250.003 |
| 6,654,982 B1 | | 12/2003 | Cowan |
| 6,694,564 B2 | | 2/2004 | Hospital |
| 6,966,095 B2 | | 11/2005 | Brown |
| 2003/0000040 A1 | | 1/2003 | Trajkovic et al. |

FOREIGN PATENT DOCUMENTS

| | | |
|---|---|---|
| DE | 10257695 | 6/2004 |
| FR | 2854365 | 11/2004 |
| GB | 2.029.691 | 5/1979 |

\* cited by examiner

*Primary Examiner* — Dung Van Nguyen
(74) *Attorney, Agent, or Firm* — Michael I. Kroll

(57) ABSTRACT

A wiper system for flat or nearly flat surfaces utilizing a track system whereby a substantially vertical blade is disposed across a primarily planar surface to remove obstructing matter in a non stop horizontal reciprocation that may be set to do so in a plurality of differentiating track configurations. Additionally the present invention may be utilized and best suited for windshields, residential windows, metal paneling or headlights.

15 Claims, 13 Drawing Sheets

SURFACE CLEANING SYSTEM

BACKGROUND OF THE INVENTION

1. Field of the Invention

The present invention relates generally to wiping systems more specifically, to a system for cleaning large planer surfaces that may be structured in a plurality of configurations comprising primarily a traveling cleaning arm connected at both ends to hinge subassemblies integral to an extending track utilized for the guidance and synchronized movement of the hinges and subassemblies utilized for creating a continuous movement across the surface to be cleaned involving, no full stop while essentially cleaning the entire surface in subject. The present invention may be utilized in the more effective cleaning or wiping of typically an automotive windshield, windows of a residence, metallic paneling or headlights.

2. Description of the Prior Art

There are other wiping devices designed for cleaning planer surfaces. Typical of these is U.S. Pat. No. 2,607,065 issued to Dahlgren on Aug. 19, 1952.

Another patent was issued to Turner et al. on Aug. 26, 1952 as U.S. Pat. No. 2,607,944. Yet another U.S. Pat. No. 2,738,536 was issued to Spencer, Jr. on Mar. 20, 1956 and still yet another was issued on Apr. 8, 1958 to Brigmon as U.S. Pat. No. 2,829,394.

Another patent was issued to Peterson on Sep. 5, 1972 as U.S. Pat. No. 3,688,334. Yet another U.S. Pat. No. 4,649,590 was issued to Merkel et al. on Mar. 17, 1987. Another was issued to Wong on Nov. 8, 1988 as U.S. Pat. No. 4,782,548 and still yet another was issued on Jul. 4, 1995 to Battlogg as U.S. Pat. No. 5,428,859.

Another patent was issued to Battlogg on Jul. 23, 1996 as U.S. Pat. No. 5,537,705. Yet another U.S. Pat. No. 5,613,267 was issued to Battlogg on Mar. 25, 1997. Another was issued to Hayashi et al. on Jul. 13, 1999 as U.S. Pat. No. 5,920,948 and still yet another was issued on Mar. 11, 2003 to Breau et al. as U.S. Pat. No. 6,530,110.

Another patent was issued to Cowan on Dec. 2, 2003 as U.S. Pat. No. 6,654,982. Yet another U.S. Pat. No. 6,694,564 was issued to Hospital on Feb. 24, 2004. Another was issued to Brown on Nov. 22, 2005 as U.S. Pat. No. 6,966,095 and still yet another was published on Jan. 2, 2003 to Trajkovic et al. as U.S. Patent Application Publication 2003/0000040.

Another patent was issued to Nishikawa on May 18, 1979 as U.K. Patent No. GB2029691. Yet another German Patent No. DE 10257695 was issued to Moll et al on Jun. 24, 2004. Another was issued to Mulato on Nov. 5, 2004 as French Patent No. FR2854365.

U.S. Pat. No. 2,607,065

Inventor: John Victor Stanley Dahlgren

Issued: Aug. 19, 1952

In a windshield wiper, a wiper blade, an oscillating hub having a diametric aperture, a driving arm slidably extending through the aperture in the hub with the blade attached to said arm, and means for sliding said arm through said hub as it oscillates to vary the distance between the axis of the hub and the point of attachment for the arm to the wiper blade for causing said blade to travel in a substantially straight path across the windshield.

U.S. Pat. No. 2,607,944

Inventor: William Turner et al.

Issued: Aug. 26, 1952

In a wiper for a windshield having a pane of glass mounted in a frame, the combination which comprises a windshield wiper arm pivotally mounted on the frame of a windshield, said arm having an offset outer end, a channel shaped clip carried by the outer end of the arm an extension arm carried by the channel shaped clip of the wiper arm, said extension arm having laterally projecting ends formed with slots therein a flat bar slidably mounted in the slots in the ends of the extension arm, a wiper suspended from a point intermediate of the ends thereof on said flat bar rollers carried by the outer end of the flat bar, a substantially enclosed channel on the frame of the windshield in which the rollers travel for guiding the outer end of the said flat bar and wiper thereon at the windshield wiper arm travels across the glass of the windshield, and another wiper mounted at a point intermediate of the ends thereof on the outer end of said wiper arm.

U.S. Pat. No. 2,738,536

Inventor: Allan T. Spencer

Issued: Mar. 20, 1956

A windshield wiper of the class described comprising an oscillating shaft mounted in a first housing, a bracket carried by said shaft and rotated thereby, a first gear on said shaft and a second gear meshed therewith and carried by a second shaft rotateable within said first housing, the ratio of the first gear to the second gear being 2:1, a crank arm on the second gear shaft, a second housing having a wiper arm shaft rotateable therein, said shaft carrying a wiper blade, said second housing being connected to the bracket by a sidable connection, a link connecting said crank arm and said second housing, and means connecting said oscillating shaft and said wiper arm shaft whereby the wiper blade on said wiper arm shaft remains vertical as the second housing oscillates.

U.S. Pat. No. 2,829,394

Inventor: Paul L. Brigmon

Issued: Apr. 8, 1958

In combination an inclined window pane for vehicle wraparound windshields and the like comprising a central rearwardly inclined pane portion terminating in curved end portions extending rearward away from the central portion, a lower horizontal edge extending along the central and end curved portions and continuing as arcuate end edges extending vertically and forwardly into an upper edge rearwardly disposed relative to said lower horizontal edge, a first guide rail bordering the upper edge of the window pane and continuing about the arcuate end edges terminating at the lower horizontal edge adjacent the curved end portions of the window pane. A second guide rail bordering the lower horizontal edge of the pane and including accurate abutment end portions in spaced relation from opposite terminal ends of the first guide rail, an extensible wiping blade assembly extending between the first and second guide rails in wiping engagement with the outer surface of the window pane and including means conforming to varying curvatures of the window pane, an extensible drive shaft assembly pivotally connected at one end to a portion of the wiping blade assembly, and oscillating power means operatively connected to the other end of said drive shaft assembly transverseing the wiping blade assembly across the outer surface of the window pane in a combined rectilinear and pivotal path of movement as the lower end of the wiping blade assembly moves along the second guide rail and into and out of engagement with the abutment end portions thereof.

U.S. Pat. No. 3,688,334

Inventor: Donald W. Peterson

Issued: Sep. 5, 1972

In a preferred form, this disclosure relates to a windshield wiper apparatus which is operable to reciprocate a windshield wiper in generally horizontal path across the windshield while maintaining the wiper in a generally vertical disposition during a running operation and which is operable to park the same in a generally horizontal position adjacent the lower edge of the windshield when wiper operation is being terminated. The windshield wiping apparatus includes a stationary support means, a lever means pivotally supported at one end by the support means and which is adapted to be swung to and from for reciprocally moving a wiper pivotally connected to its other end through first and second strokes across the windshield a first drive means operatively connected with the wiper for simultaneously rotating the wiper relative to the lever means to increase the stroke length in response to swinging movement being imparted to the lever means, a second drive means for moving an articulating means relative to the lever means to maintain the wiper blade assembly in a generally vertical disposition as it moves through its strokes, and a parking mechanism which is operable to permit the wiper and articulating means to move relative to the lever means as the latter is swung to and from during running operation and which is operable to prevent relative movement therebetween when the wiper is midway through one of its strokes when running operation is terminated to effect movement of the wiper from a generally vertical disposition to a generally horizontal park position adjacent the lower edge of the windshield.

U.S. Pat. No. 4,649,590

Inventor: Wilfried Merkel, et al.

Issued: Mar. 17, 1987

In a windshield wiper, which includes a wiper arm carrying a wiper blade and driven by a wiper shaft to oscillate against a windshield pane being wiped, a lever mechanism is provided, which imparts to the wiper arm additionally a straight-line shifting movement in the direction of elongation of the wiper arm. The lever mechanism includes two four-joint guides, each of which includes two rocking levers positioned at two sides relative to the axis of the wiper arm, and a coupling rod which is connected by joints to each of the rocking levers and to the wiper arm.

U.S. Pat. No. 4,782,548

Inventor: Edward Y. Wong

Issued: Nov. 8, 1988

A linear-motion wiper structure comprising a multistage hydraulic cylinder arm which can be driven by a transmission mechanism having both vertical and horizontal displacement function whereby a blade, which is driven by the arm, can wipe on the windshield in a linear reciprocating motion so as to completely clear the drops of rain on the windshield, and this may provide a clear vision for users who drive in the rain.

U.S. Pat. No. 5,428,859

Inventor: Stefan Battlogg

Issued: Jul. 4, 1995

A windscreen-wiper system in which a wiper blade is rotatably mounted on a telescopically extendable part of the wiper arm and can be moved, lying substantially flat, laterally over the vehicle windscreen. The drive producing the pivoting motion of the wiper arm is transmitted to the wiper arm via two cable lines, the first of which causes the wiper blade to rotate when its two lengths of cable move relative to each other. The second cable line is used to alter the length of the wiper arm. It consists of paying-out a cable which passes over a first pulley driven by the wiper arm pivoting motion drive and over a second pulley mounted on the lower part of the wiper arm, and is attached to the telescopic part of the wiper arm, and a pulling-in cable which is made up of both the lengths of cable (8, 9) and passes from the pulley (10) mounted on the telescopic part of the wiper arm back to the driven pulley (18).

U.S. Pat. No. 5,537,705

Inventor: Stefan Battlogg

Issued: Jul. 23, 1996

A windscreen wiper system has a wiper arm provided with a swiveling drive, a pivot bearing for a wiper blade being provided on the free end part of said wiper arm. The wiper blade can be moved into a rest position in the region of the lower edge of the windscreen in which it lies approximately parallel to the wiper arm. A control mechanism associated with the swiveling drive ensures parallel guiding of the rotary wiper blade and has a control element fastened to the vehicle with which a scanning element belonging to the wiper arm is associated. For transition into the rest position, a device for change-over from parallel to swiveling guiding of the wiper blade is provided. This comprises an adjusting drive which places the control mechanism out of action in a central working position and stops the rotary drive of the wiper blade.

U.S. Pat. No. 5,613,267

Inventor: Stefan Battlogg

Issued: Mar. 25, 1997

The wiper arm of a windshield wiper system for passenger vehicles is oscillating driven across the windshield and the contact pressure of the wiper blade is varied during the oscillatory motion. A driven basic body is pivoted on a pivot bearing mounted on the passenger vehicle. The wiper arm includes a wiper arm member attached to the basic body and it is resiliently biased towards the windshield. A control cam is formed at the pivot bearing and a cam follower, which is operatively associated with the wiper arm, follows the cam surface during the oscillation of the wiper arm across the windshield. The contact pressure of the wiper arm and the wiper blade onto the windshield are thus varied. The wiper arm member is formed as a leaf spring which is rigidly connected to the basic body and which is operatively associated with the cam follower.

U.S. Pat. No. 5,920,948

Inventor: Kazuhiro Hayashi, et al

Issued: Jul. 13, 1999

A wiper device is composed of a wiper blade and a wiper arm connected to the wiper blade, a first drive link having a stationary joint rotatably secured to a portion of a vehicle, a second drive link having a first movable joint and a second movable joint connected to the wiper arm. The second drive link and the wiper arm are arranged so that the first movable joint can move along a track crossing a straight line connecting the stationary joint and the second movable joint. The first and second drive links are folded when the wiper arm is going to turn and reverse its course.

U.S. Pat. No. 6,530,110

Inventor: Tony Breau, et al.

Issued: Mar. 11, 2003

A mirror cleaning system has a mirror with a mirror support assembly, a drive assembly including a drive shaft to effect rotation, a motor, a hollow cross piece including a supported wiper arm and at least one aperture spaced along the length thereof, and a length of hollow flexible tubing adapted to be coupled to the cross piece and a source of pressurized cleaning fluid.

U.S. Pat. No. 6,654,982

Inventor: William Q. Cowan

Issued: Dec. 2, 2003

A rearview truck mirror and wiper assembly for improving the rear view for truckers by keeping the mirror clean and lighted. The rearview truck mirror and wiper assembly includes a first housing assembly including a first housing member having side, top, bottom, and back walls, and also including an open front, and also including a mirror being securely disposed at the open front of the first housing member with the first housing assembly being adapted to be securely mounted to mirror supports on a truck; and also includes a second housing member being attached to the first housing member and having top, bottom, front and side walls; and further includes a wiper drive assembly being disposed in the second housing member and including a track member and a two-directional motor; and also includes a wiper assembly being attached to the wiper drive assembly and including a wiper member being movable upon the mirror; and further includes a heating element being disposed in the first housing member; and also includes a light-emitting assembly also being disposed in the first housing member.

U.S. Pat. No. 6,694,564

Inventor: Eric Hospital

Issued: Feb. 24, 2004

A reciprocating linear sweeping wiping mechanism includes a guide and drive carriage bearing at least a wiper element slidingly mounted inside at least a rigid longitudinal guide rail produced in the form of a hollow extruded profile. The transverse positioning of the frame plate relative to the extruded profile includes a longitudinally oriented rigid rib borne by the extruded profile or by a frame plate, which is received longitudinally sliding in a vertically open matching longitudinal groove borne by the frame plate or the extruded profile, respectively, and each stabilizing element is a stabilizing pad which is longitudinally slidingly received inside the corresponding C-shaped slide rail.

U.S. Pat. No. 6,966,095

Inventor: Robert Cushman Brown

Issued: Nov. 22, 2005

A system for wiping a windshield of a vehicle in a rectangular field, comprising a wiper arm, a wiper blade assembly operationally attached to the wiper arm, and means for rotating and translating the wiper arm to cause said wiper blade assembly to track in a linear path across the windshield. The system includes a three-gear train for moving a pivot point on the wiper arm along a circular path centered on a virtual pivot point. The system is especially suited for wiping low aspect ratio windshields.

U.S. Patent Application Publication 2003/0000040

Inventor: Miroslav Trajkovic, et al.

Issued: Jan. 2, 2003

A windshield wiper is moved across a windshield by a linear motor employing an induction effect. A stator is attached to a vehicle and a driver or truck attached to a wiper blade. Either the stator or driver has coils that are actuated to move the driver across the windshield carrying the blade with it. The blade is swept back and forth with the driver.

U.K. Patent Number GB2029691

Inventor: Tadashi Nishikawa

Issued: May 18, 1979

A windscreen wiper mechanism comprises a helical coil 2 arranged to rotate about the periphery of a windscreen and a wiper blade 3 joined at each end to the coil and extending across the windscreen. The coil may be housed in a channel 16 in a guide rail 9, and may be driven by a pair of gear wheels arranged opposite each other adjacent the coil. Each end of the wiper blade may be connected to the coil, via a connector 22 comprising rollers 23 which run in channel 14. The wiper blade may be formed from interconnected hexagonal elements, or associated with an expansible sleeve formed from telescopically-arranged units. Other forms of wiper blade are shown in FIGS. 11 and 15. The helical coil may consist of an arrangement of coils one within the other. Alternatively, a plastics sleeve having an outer helical configuration and incorporating a helical coil may be used.

German Patent Number DE10257695

Inventor: Patrick Moll, et al.

Issued: Jun. 24, 2004

The wiper is connected to a guide slide and is guided by a power transmission element along a guide track on a guide rail. The transmission element is a flexible pressure and/or traction-resistant rod (7) or cable. This is connected to the guide slide and outside the guide rail (1), within a curved area (15,16), it is axially adjustable in a stationary guide tube (12), by a drive element of a motor drive (13). Guide rail, guide tube, and drive element are located completely or partially between an upper rear spoiler and a vehicle body or tailgate (19), or within the vehicle body, or behind the rear window.

French Patent Number FR2854365

Inventor: Gilles Mulato, et al.

Issued: Nov. 5, 2004

The device has a windshield wiper motor including a revolving circular track (10) with two radial projections acting as position indicators (11,12). The indicator (11) is directed towards outside of the track and cooperates with a fixed tripolar contact. The indicator (12) is directed towards inside of the track. The motor is electronically controlled by an electronic control unit of a motor vehicle. An Independent claim is also included for a method of controlling a windshield wiper of a motor vehicle.

While these wiper assemblies may be suitable for the purposes for which they were designed, they would not be as suitable for the purposes of the present invention, as hereinafter described.

SUMMARY OF THE PRESENT INVENTION

A primary object of the present invention is to provide a wiper system for flat or nearly flat surfaces having a continuously transversing blade with no abrupt stops.

Another object of the present invention is to provide a wiper system for flat or nearly flat surfaces having a cleaning arm each end at which hinge subassemblies which are set on and driven along tracks to clean said flat or nearly flat surface.

Yet another object of the present invention is to provide a wiper system for flat or nearly flat surfaces having a plurality of track and guide configurations for the accommodating of differentiating reciprocating paths and procedures.

Still yet another object of the present invention is to provide a wiper system for flat or nearly flat horizontally oriented surfaces utilizing a single vertically disposed traveling cleaning arm or for vertically oriented surfaces, utilizing a single horizontally disposed traveling cleaning arm.

Another object of the present invention is to provide a wiper system for flat or nearly flat surfaces that may be applied to cleaning windshields, residential windows, metal panels or headlights.

Additional objects of the present invention will appear as the description proceeds.

The present invention overcomes the shortcomings of the prior art by providing wiper system for flat or nearly flat surfaces utilizing a track system whereby a substantially vertical blade is disposed across a horizontally oriented primarily planar surface to remove obstructing matter in a non stop horizontal reciprocation or cycling that may be set to do so in a plurality of differentiating track configurations. Additionally the present invention may be utilized and best suited for windshields, residential windows, metal paneling or headlights.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
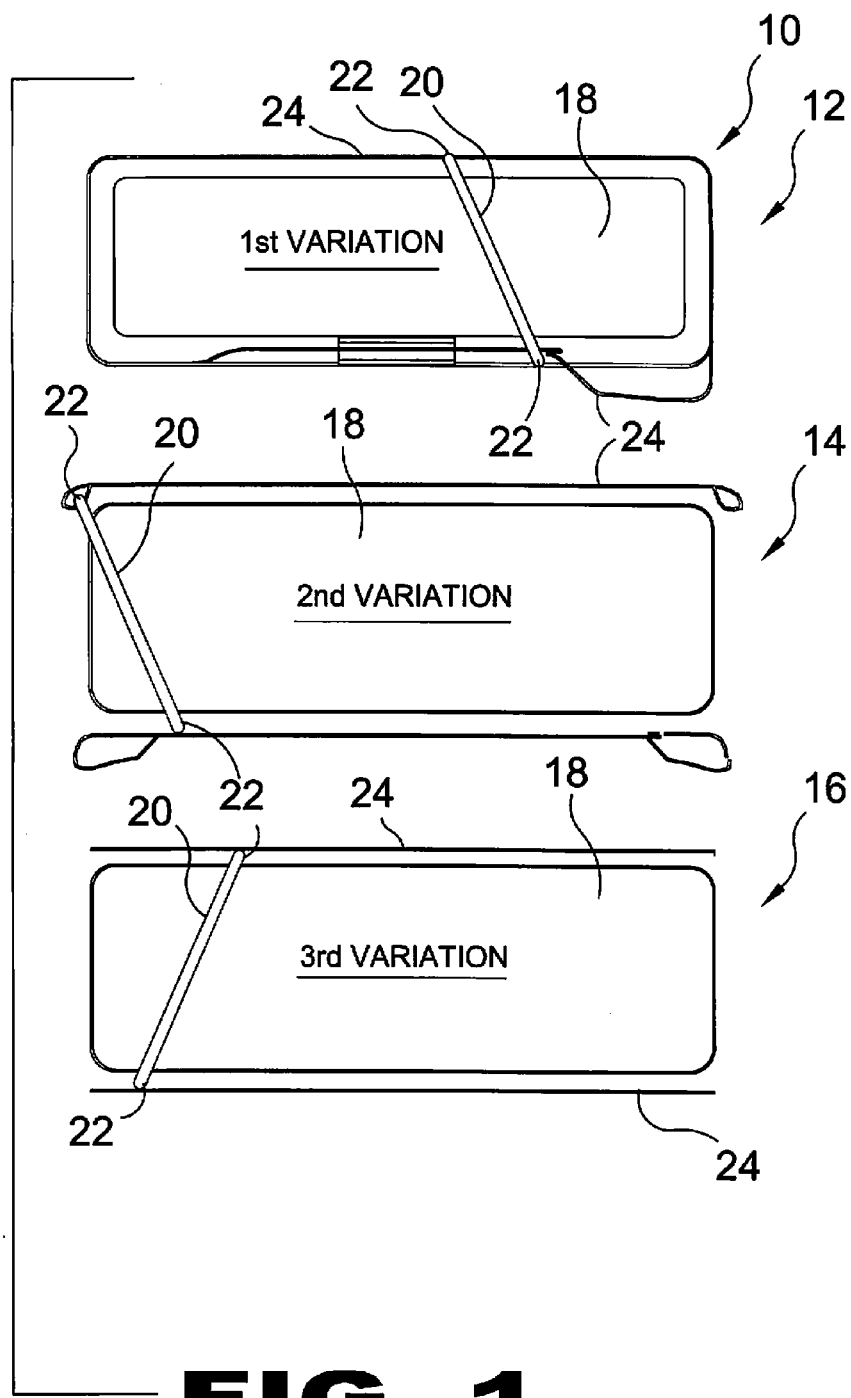
FIG. 1 is a diagram of the three methods and devices of the present invention.

Turning now descriptively to the drawings, in which similar reference characters denote similar elements throughout the several views, the figures illustrate the Surface Cleaning System of the present invention. With regard to the reference numerals used, the following numbering is used throughout the various drawing figures.

10 Surface Cleaning System of the present invention
12 first variation of 10
14 second variation of 10
16 third variation of 10
18 surface
20 cleaning arm
22 hinge subassembly
24 track
26 blade cleaner
28 rubber squeegee
30 fluid dispenser
32 scrubber member
34 upper track
36 lower track
38 track extension of 12
40 spring-loaded telescoping cleaning arm
42 spring

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is a diagram of the three methods and devices of the present invention 10. The present invention 10 is a surface and cleaning system (with a first variation 12, a second variation 14 and a third variation 16) comprising a surface to be cleaned 18, a cleaning arm 20 attached on both ends to hinge subassemblies 22, each hinge subassembly 22 being on a track 24, the tracks 24 providing a predetermined path and means of synchronized movement for the hinge subassemblies 22 and therefore cleaning arm 20 over the cleaning surface 18 in a continuous movement involving no full stop, and covering essentially the entire cleaning surface 18.

Figure 2:
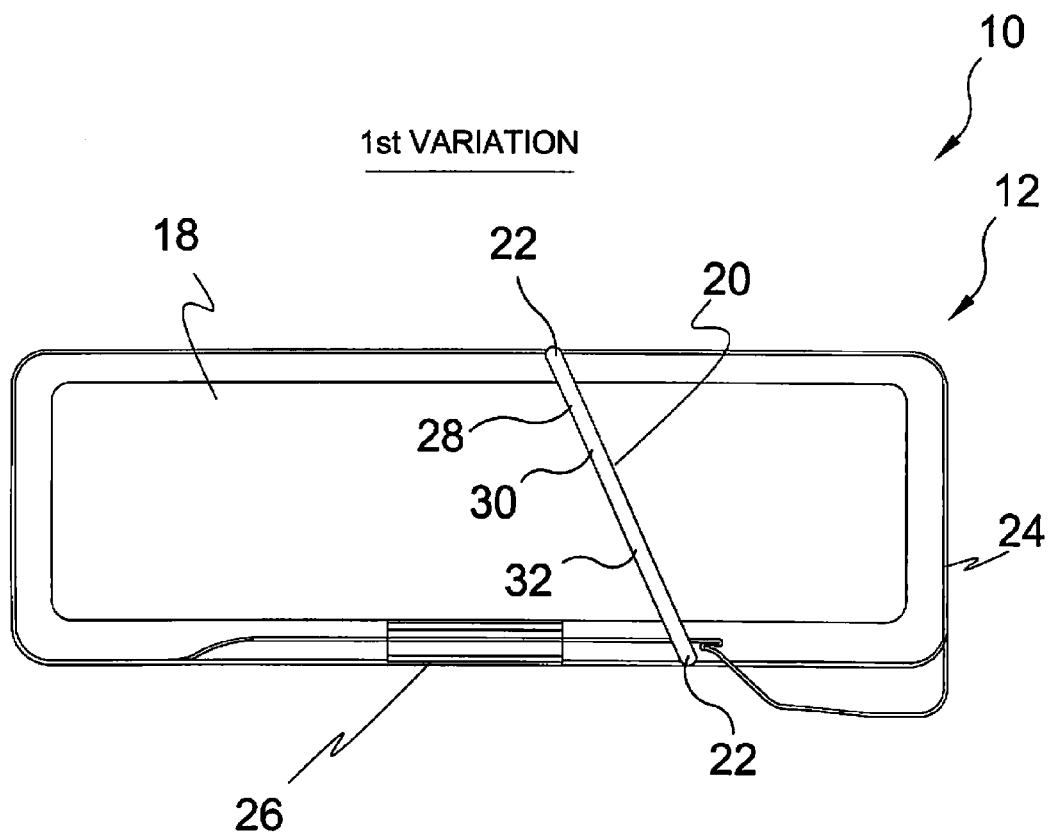
FIG. 2 is the first variation of the present invention.

FIG. 2 is the first variation 12 of the present invention 10 providing a surface 18 such as an automotive windshield, window in a house, metallic panel of an automobile or headlight cover of a vehicle and cleaning subassembly having a cleaning arm 20 of fixed length with buffer to allow minor distance variation or of variable length with a predetermined range. The cleaning arm 20 is attached on both ends to a hinge subassembly 22 and includes one or more cleaning elements such as a rubber squeegee 28, fluid dispenser 30, or scrubber 32. The track 24 submerges into a blade cleaner 26 and allows the cleaning arm 20 to pass through for cleaning.

Figure 3:
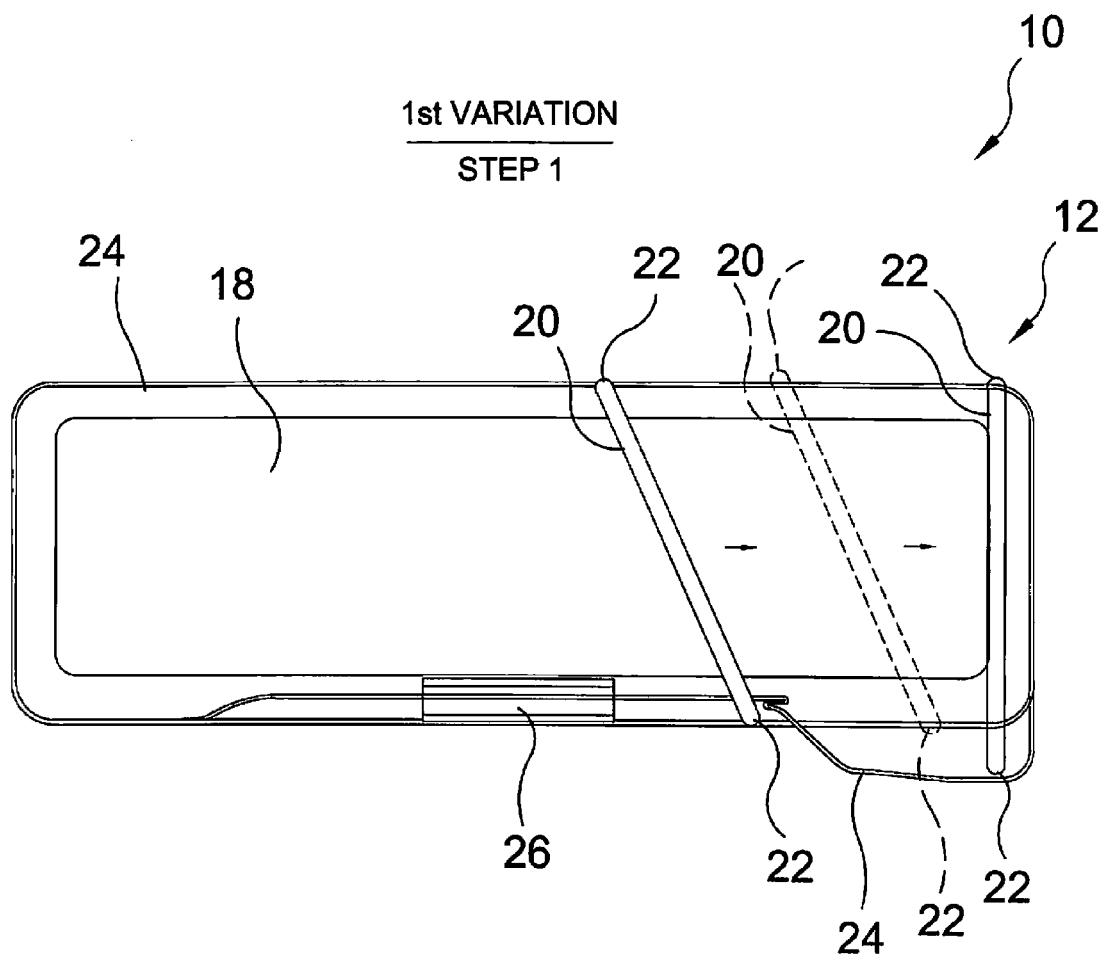
FIG. 3 is step one of the first variation of the present invention.

FIG. 3 is step one of the first variation 12 of the present invention 10 providing a surface 18 such as an automotive windshield, window in a house, metallic panel of an automobile or headlight cover of a vehicle and cleaning subassembly having a cleaning arm 20 of fixed length with buffer to allow minor distance variation or of variable length with a predetermined range. The cleaning arm 20 is attached on both ends to a hinge subassembly 22 and includes one or more cleaning elements such as a rubber squeegee, fluid dispenser, or scrubber. The track 24 submerges into a blade cleaner 26 to clear the cleaning arm 20 of debris.

Figure 4:
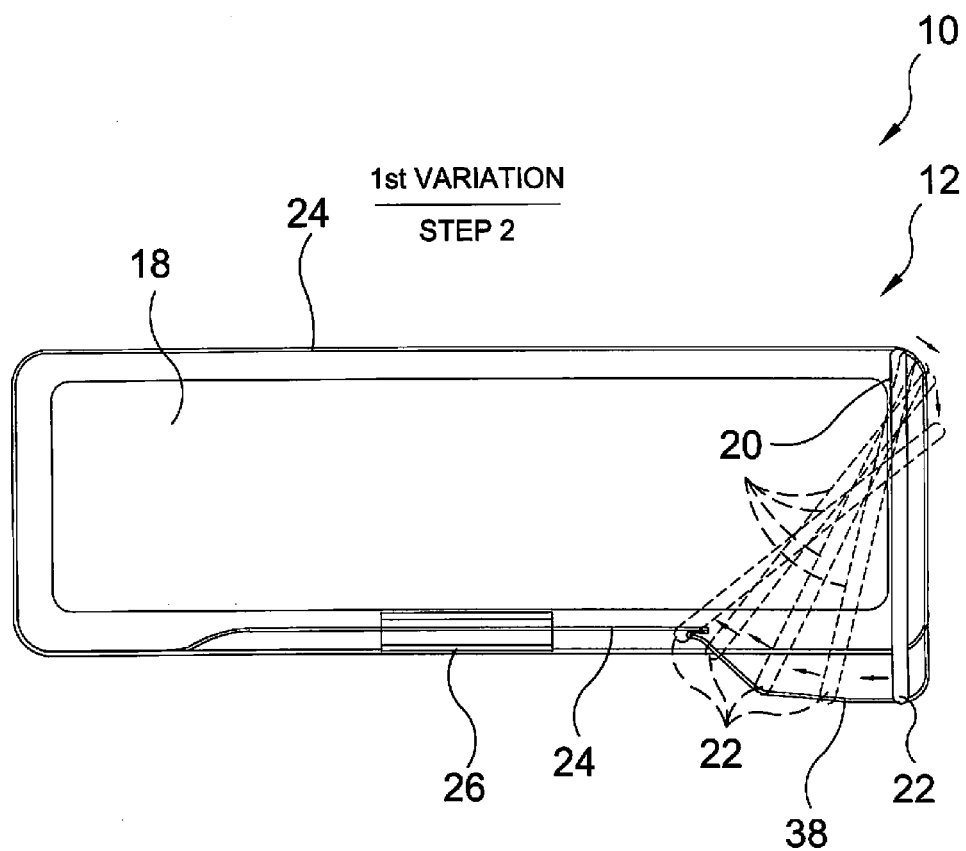
FIG. 4 is step two of the first variation of the present invention.

FIG. 4 is step two of the first variation 12 of the present invention 10 providing a surface 18 such as an automotive windshield, window in a house, metallic panel of an automobile or headlight cover of a vehicle and cleaning subassembly having a cleaning arm 20 of fixed length with buffer to allow minor distance variation or of variable length with a predetermined range. The cleaning arm 20 is attached on both ends to a hinge subassembly 22 and includes one or more cleaning elements such as a rubber squeegee, fluid dispenser, or scrubber. The track 24 submerges into a blade cleaner 26 to rinse the cleaning arm 20. Shown is the cleaning arm 20 as the lower hinged subassembly 22 passes through the track extension 38 on the bottom of the track 24.

Figure 5:
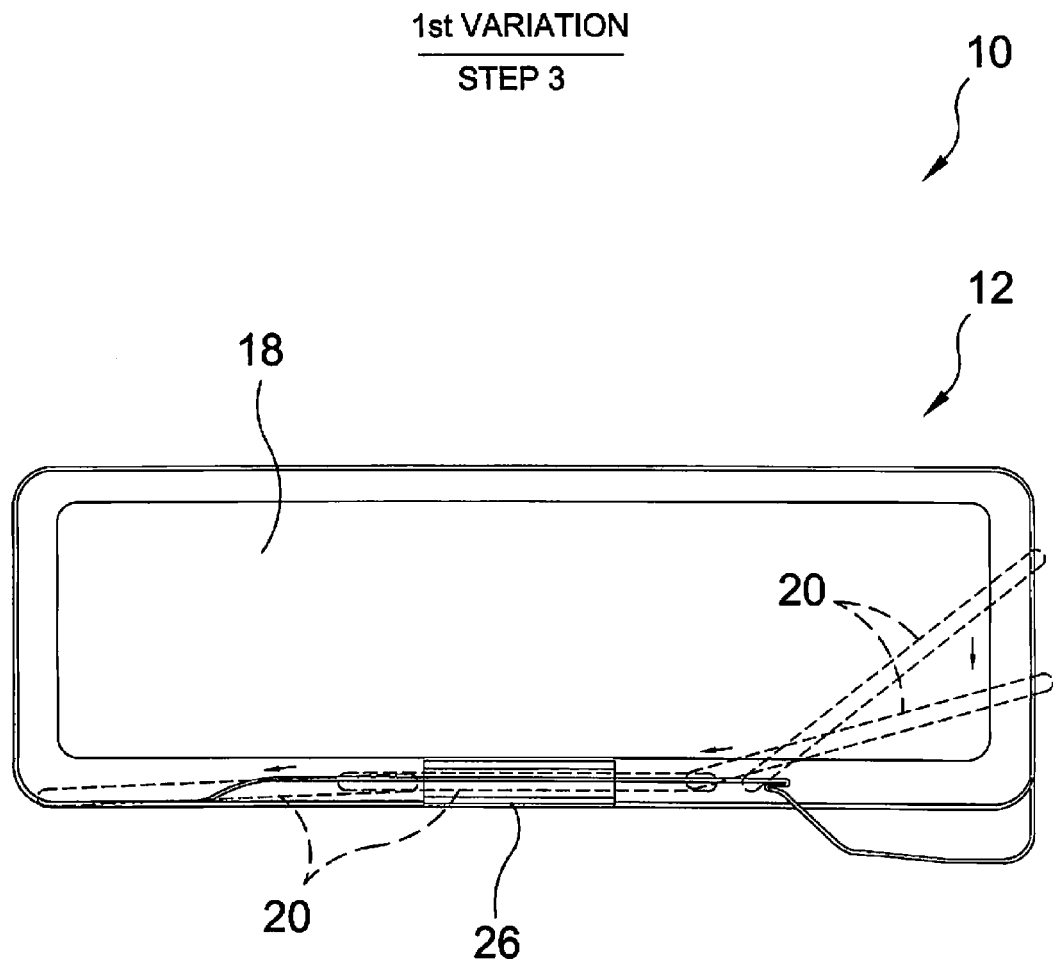
FIG. 5 is step three of the first variation of the present invention.

FIG. 5 is step three of the first variation 12 of the present invention 10 providing a surface 18 such as an automotive windshield, window in a house, metallic panel of an automobile or headlight cover of a vehicle and cleaning subassembly having a cleaning arm 20 of fixed length with buffer to allow minor distance variation or of variable length with a predetermined range. Shown is the cleaning arm 20 as it travels through the blade cleaner 26.

Figure 6:
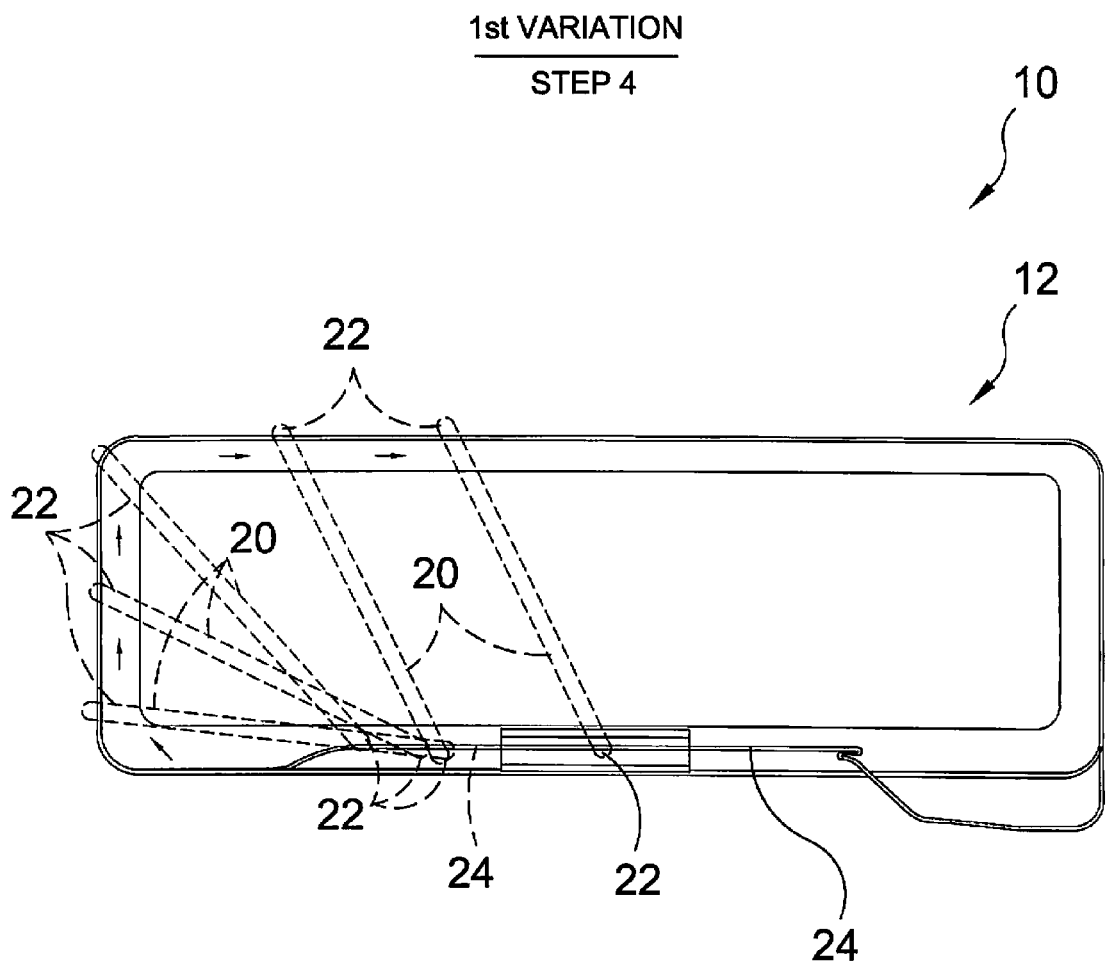
FIG. 6 is step four of the first variation of the present invention.

FIG. 6 is step four of the first variation 12 of the present invention 10. Shown is the cleaning arm 20 returning to a substantially vertical position after passing through the blade cleaner 26. The cleaning arm 20 has hinged subassemblies 22 disposed on the ends thereof that travel along the track 24

Figure 7:
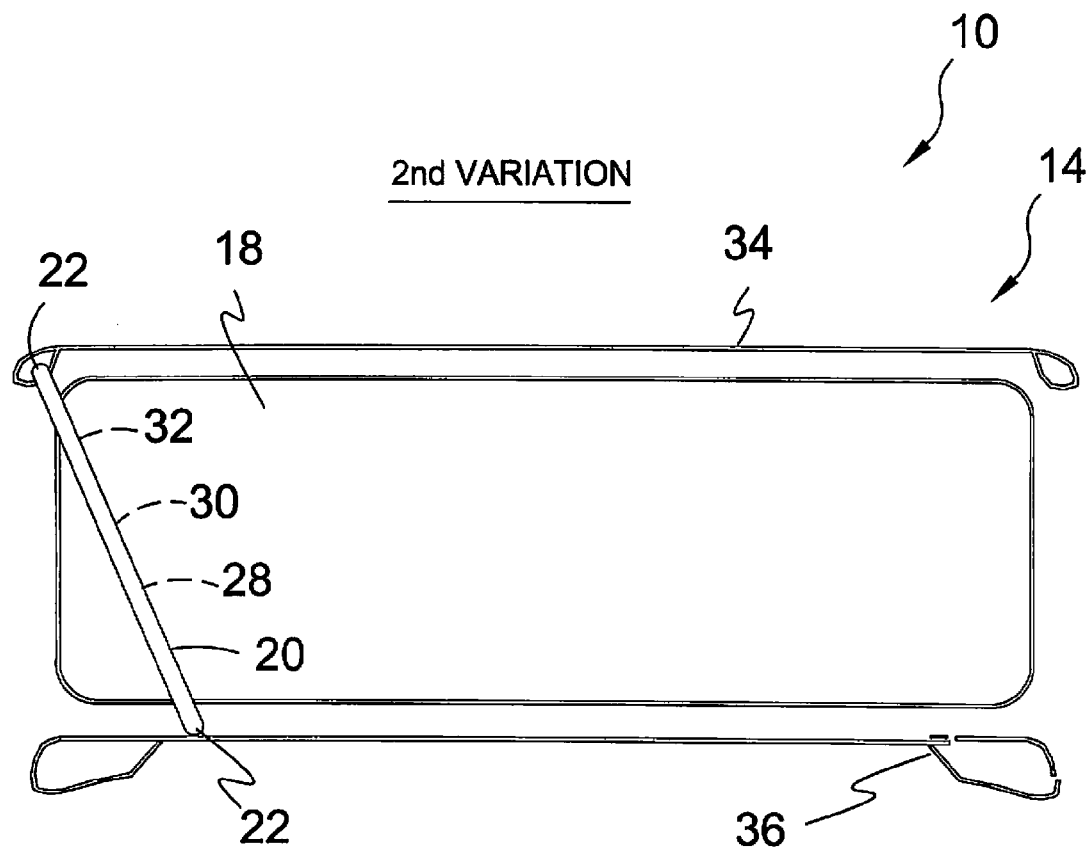
FIG. 7 is the second variation of the present invention.

FIG. 7 is the second variation 14 of the present invention 10. Shown is the second variation 14 of the present invention 10 providing a surface 18, such as an automotive windshield, window in a house, metallic panel of an auto or headlight cover of a vehicle and cleaning assembly having a cleaning arm 20 of fixed length or of variable length with a predetermined range. The arm 20 is attached on both ends to a hinge subassembly 22. There is an upper track member 34 and a lower track member 36, each having a closed loop at the ends thereof. The cleaning arm 20 travels reciprocatively along the track members 34, 36 and includes one or more cleaning elements such as a rubber squeegee 28, a fluid dispenser 30, or scrubber 32. Fluid is introduced to the fluid dispenser 30 integral with the cleaning arm 20 through one of the hinged subassemblies 22.

Figure 8:
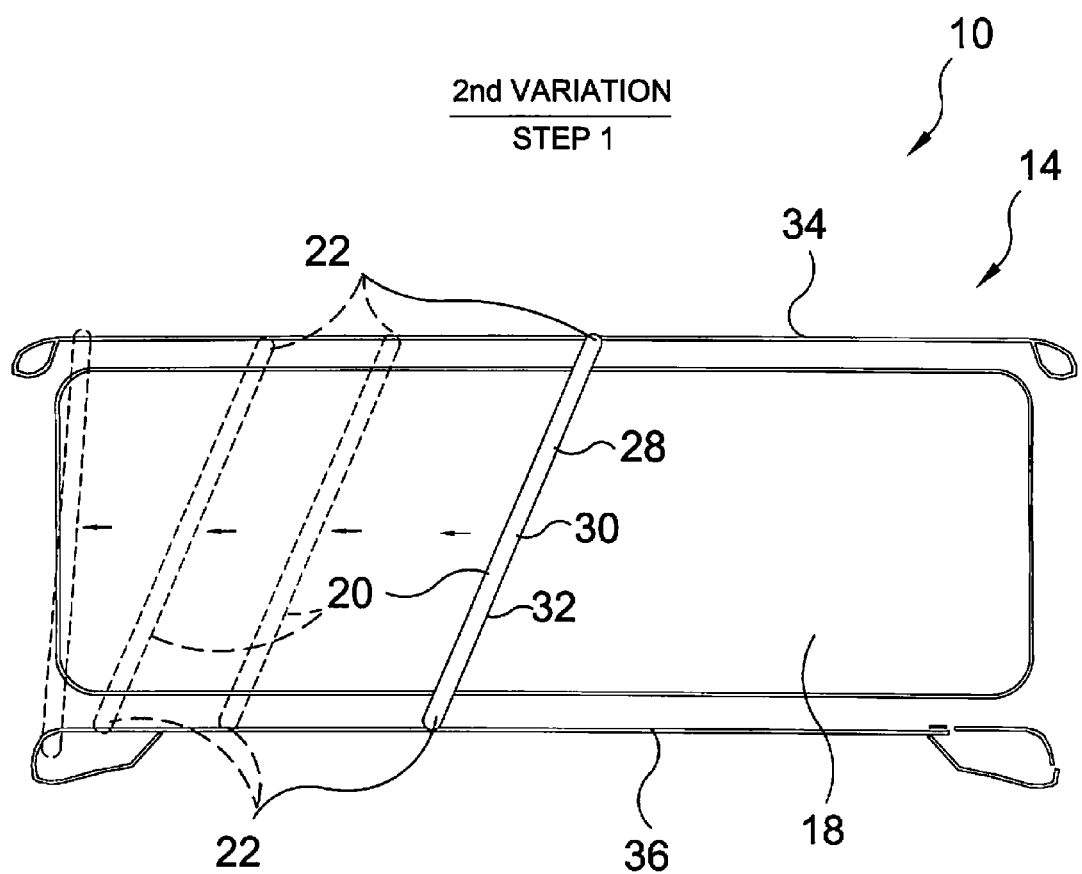
FIG. 8 is step one of the second variation of the present invention.

FIG. 8 is step one of the second variation 14 of the present invention 10. Shown is the second variation 14 of the present invention 10 providing a surface 18, such as an automotive windshield, window in a house, metallic panel of an auto or headlight cover of a vehicle and cleaning assembly having a cleaning arm 20 of fixed length or of variable length with a predetermined range. The arm 20 is attached on both ends to a hinge subassembly 22. There is an upper track member 34 and a lower track member 36, each having a closed loop at the ends thereof. The cleaning arm 20 travels reciprocatively along the track members 34, 36 and includes one or more cleaning elements such as a rubber squeegee 28, a fluid dispenser 30, or scrubber 32. Fluid is introduced to the fluid dispenser 30 integral with the cleaning arm 20 through one of the hinged subassemblies 22.

Figure 9:
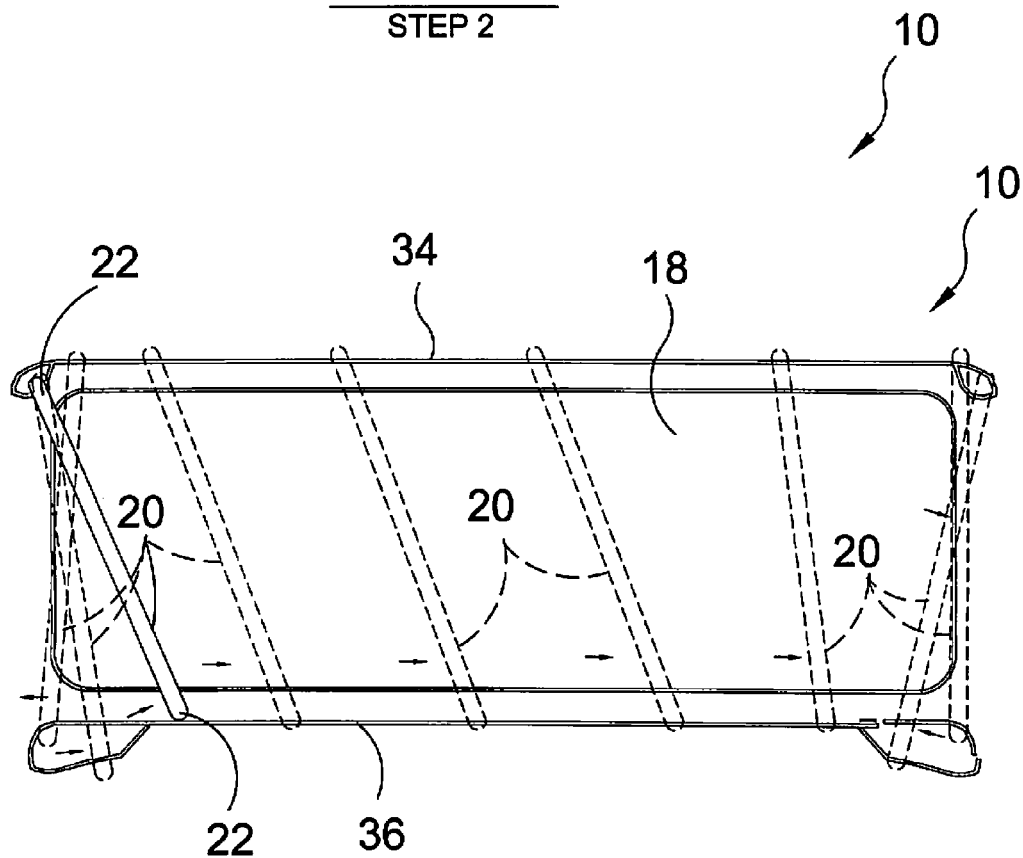
FIG. 9 is step two of the second variation of the present invention.

FIG. 9 is step two of the second variation 14 of the present invention 10. Shown is the second variation 14 of the present invention 10 providing a surface 18, such as an automotive windshield, window in a house, metallic panel of an auto or headlight cover of a vehicle and cleaning assembly having a cleaning arm 20 of fixed length or of variable length with a predetermined range. The arm 20 is attached on both ends to a hinge subassembly 22. There is an upper track member 34 and a lower track member 36, each having a closed loop at the ends thereof. The cleaning arm 20 travels reciprocatively along the track members 34, 36.

Figure 10:
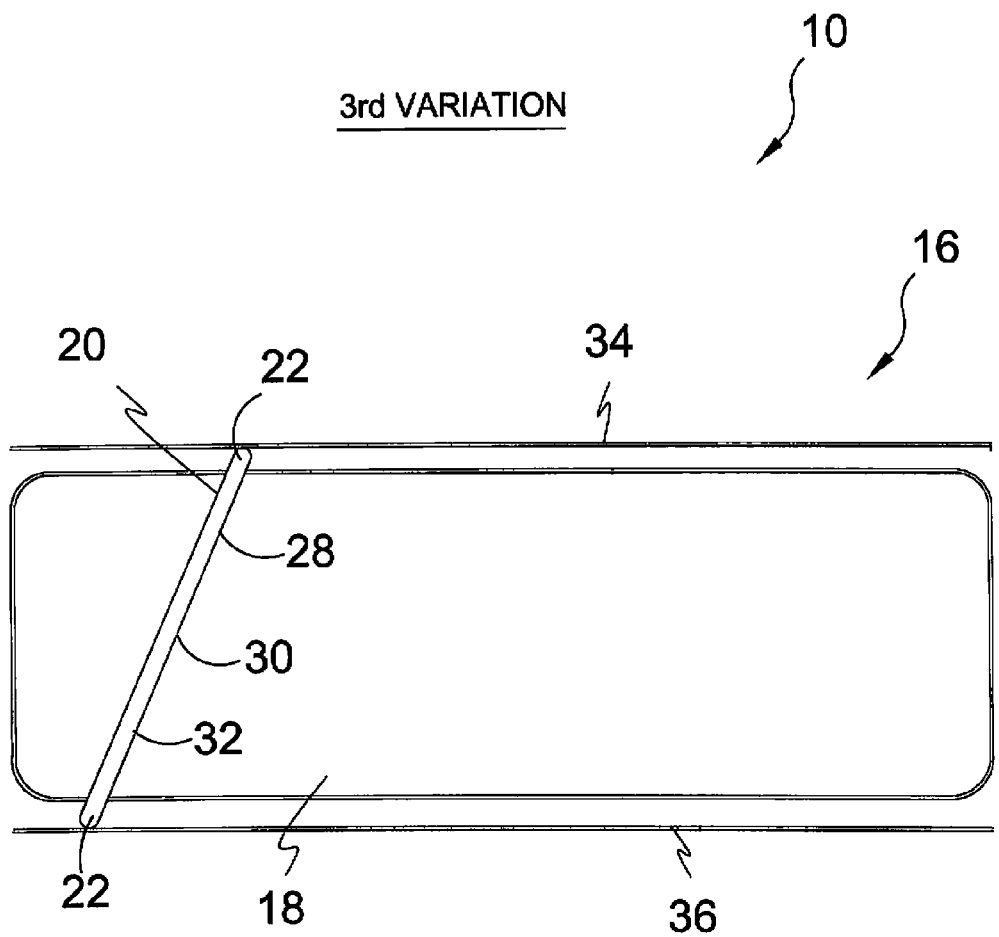
FIG. 10 is the third variation of the present invention.

FIG. 10 is the third variation 16 of the present invention 10. Shown is the third variation 16 of the present invention 10 providing a surface 18, such as an automotive windshield, window in a house, metallic panel of an auto or headlight cover of a vehicle and cleaning assembly having a cleaning arm 20 of fixed length or of variable length with a predetermined range. The arm 20 is attached on both ends to a hinge subassembly 22. There is an upper track member 34 and a lower track member 36. The cleaning arm 20 travels reciprocatively along the track members 34, 36.

Figure 11:
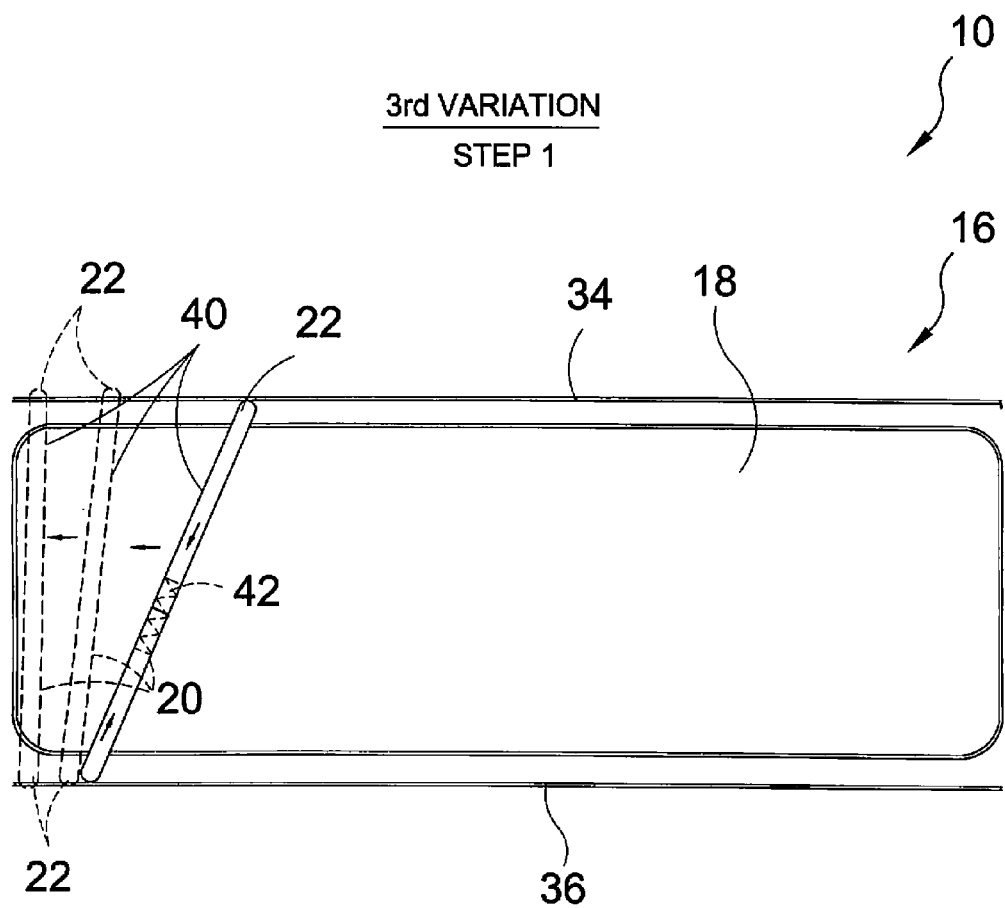
FIG. 11 is step one of the third variation of the present invention.

FIG. 11 is step one of the third variation 16 of the present invention 10 providing a surface 18, such as an automotive windshield, window in a house, metallic panel of an auto or headlight cover of a vehicle and cleaning assembly having a cleaning arm 20 of fixed length or of variable length with a predetermined range. The arm 20 is attached on both ends to a hinge subassembly 22. There is an upper track member 34 and a lower track member 36. Shown is a variable length cleaning arm retracting 40 to compensate for length differentials during operation.

Figure 12:
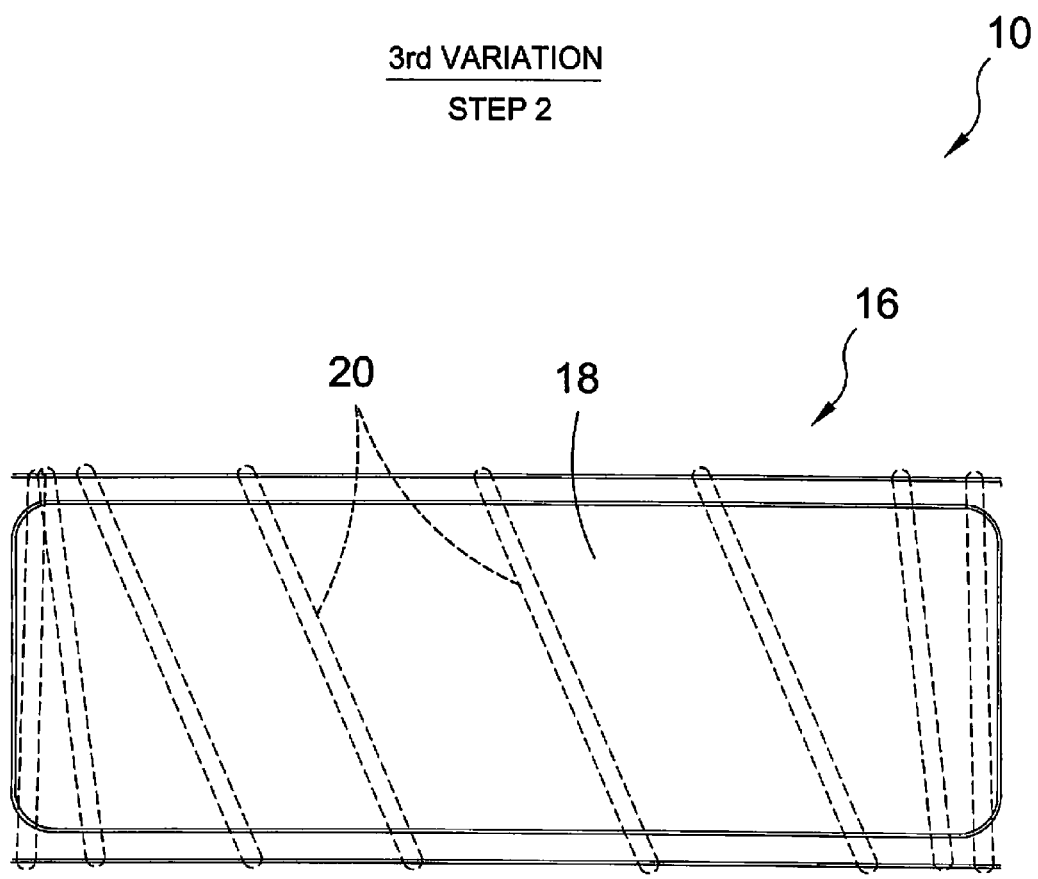
FIG. 12 is step two of the third variation of the present invention.

FIG. 12 is step two of the third variation 16 of the present invention 10 as the cleaning arm 20 continues through its progression to clean the surface 18.

Figure 13:
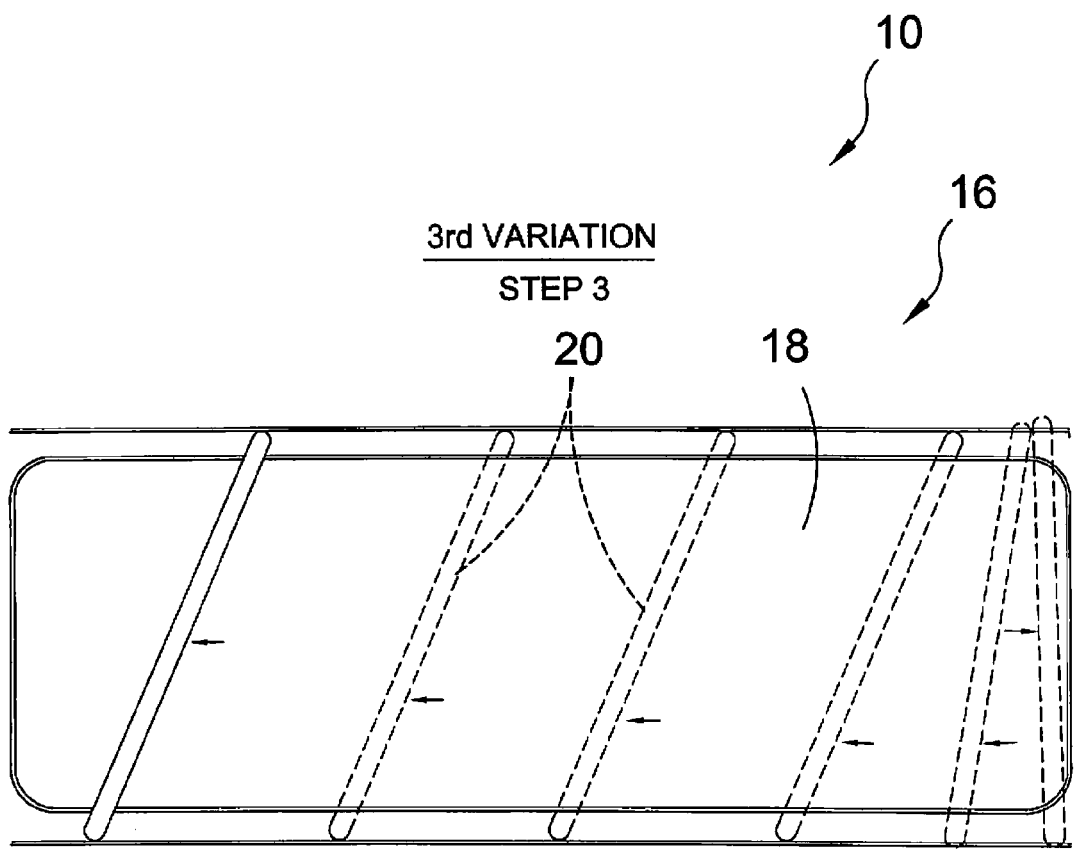
FIG. 13 is step three of the third variation of the present invention.

FIG. 13 is step three of the third variation 16 of the present invention 10 as the cleaning arm 20 continues through its progression to clean the surface 18.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention

The invention claimed is:

1. A cleaning system for removing debris from and cleaning a substantially planar surface, the cleaning system comprising:
    a) a cleaning arm with opposed ends;
    b) a hinged subassembly disposed on each end of said cleaning arm;
    c) a track to engage and control the movement of said hinged subassemblies during operation, said track having a perimeter;
    d) a blade cleaner for cleaning said cleaning arm;
    e) said track having a track extension, said track extension extending outward of said perimeter of said track, transitioning inward of said perimeter of said track, and extending through said blade cleaner;
    f) wherein said cleaning arm moves across the substantially planar surface in a substantially orthogonal relationship to a longitudinal axis of the substantially planar surface for a substantial but not an entire period of operation; and
    g) wherein said track extension allows said cleaning arm to transfer from said substantially orthogonal relationship to a substantially horizontal relationship prior to entering said blade cleaner.

2. The cleaning system recited in claim 1, wherein said cleaning arm includes a squeegee blade.

3. The cleaning system recited in claim 2, wherein said cleaning arm includes means for dispensing a fluid.

4. The cleaning system recited in claim 3, wherein said fluid dispensing means distributes fluid across the length of said cleaning arm during operation.

5. The cleaning system recited in claim 4, wherein said fluid is introduced to said cleaning arm through one of said hinged subassemblies.

6. The cleaning system recited in claim 2, wherein said cleaning arm further includes a scrubbing element for dislodging hardened debris from said surface.

7. The cleaning system recited in claim 6, wherein said cleaning arm comprises any combination including said squeegee blade, said fluid dispenser and said scrubber element.

8. The cleaning system recited in claim 7, wherein said cleaning arm is of a fixed length with a buffer attached or built into said hinge subassembly to allow for minor distance variation between hinge assemblies at each end of the cleaning arm as they traverse their respective paths.

9. The cleaning system recited in claim 7, wherein said cleaning arm is of a variable length with a predetermined range of possible lengths.

10. The cleaning system recited in claim 1, wherein said track system encompasses the periphery of said surface.

11. The cleaning system recited in claim 1, wherein said cleaning arm is scraped of external residue during passage through said blade cleaner.

12. The cleaning system recited in claim 1, wherein said cleaning arm is rigid.

13. The cleaning system recited in claim 1, wherein said cleaning arm is flexible.

14. The cleaning system of claim 1, wherein said track extension allows an end of the cleaning arm to move outward of the perimeter of the track.

15. A cleaning system for removing debris from and cleaning a substantially planar surface, the cleaning system comprising:
    a) a cleaning arm with opposed ends;
    b) a hinged subassembly disposed on each end of said cleaning arm;
    c) a track to engage and control the movement of said hinged subassemblies during operation, said track having a perimeter;
    d) a blade cleaner for cleaning said cleaning arm;
    e) said track having a track extension, said track extension extending outward of said perimeter of said track, transitioning inward of said perimeter of said track, and extending through said blade cleaner;
    f) wherein said blade cleaner has a length and a width, said cleaning arm has a length and a width, said length of said blade cleaner being shorter than the length of the cleaning arm; and
    g) wherein said track extension allows said cleaning arm to move through said blade cleaner where the length of the cleaning arm is substantially parallel to the length of the blade cleaner.

* * * * *